United States Patent [19]

Abthoff et al.

[11] 4,205,971
[45] Jun. 3, 1980

[54] SOOT FILTER IN THE EXHAUST GAS FLOW OF AIR-COMPRESSING INTERNAL COMBUSTION ENGINES

[75] Inventors: Jörg Abthoff, Plüderhausen; Hans-Dieter Schuster, Schorndorf; Rolf Gabler, Waiblingen, all of Fed. Rep. of Germany

[73] Assignee: Daimler-Benz Aktiengesellschaft, Fed. Rep. of Germany

[21] Appl. No.: 956,353

[22] Filed: Oct. 31, 1978

[30] Foreign Application Priority Data

Nov. 15, 1977 [DE] Fed. Rep. of Germany ....... 2750960

[51] Int. Cl.² .................... B01D 50/00; B01D 39/06
[52] U.S. Cl. ........................... 55/330; 55/337; 55/486; 55/498; 55/523; 55/DIG. 30; 60/311
[58] Field of Search ................ 55/323, 330, 333, 337, 55/486–488, 498, 523, 525, DIG. 30, 499; 60/311; 110/119, 216, 217

[56] References Cited

U.S. PATENT DOCUMENTS

| | | | |
|---|---|---|---|
| 1,215,385 | 2/1917 | King | 55/525 |
| 1,395,833 | 1/1921 | King et al. | 55/486 |
| 2,010,456 | 8/1935 | Jones | 55/333 |
| 2,661,811 | 12/1953 | Kautz | 55/498 |
| 3,248,188 | 4/1966 | Chute | 55/523 |
| 3,535,852 | 10/1970 | Hirs | 55/523 |
| 3,815,341 | 6/1974 | Hamand | 55/486 |

FOREIGN PATENT DOCUMENTS

| | | | |
|---|---|---|---|
| 2318171 | 11/1974 | Fed. Rep. of Germany | 55/337 |
| 47-19542 | 7/1972 | Japan | 55/523 |

Primary Examiner—David L. Lacey

[57] ABSTRACT

A soot filter adapted to be arranged in an exhaust gas stream of air-compressing internal combustion engines. The soot filter includes a cylindrical filter housing arranged in proximity of the exhaust gas stream of the internal combustion engine with inlet pipe connecting studs from outlet side of the internal combustion engine being connected to the cylindrical filter housing. A ceramic material of a hollow cylindrical shape is arranged in the filter housing at a distance from a circumferential wall of the filter housing. The ceramic material consists of an outer layer of loose ceramic fiber wadding and of inner woven ceramic fiber matting. A hollow space inside of the ceramic fiber material is connected, in an axial direction, with exhaust gas line of the internal combustion engine.

6 Claims, 3 Drawing Figures

SOOT FILTER IN THE EXHAUST GAS FLOW OF AIR-COMPRESSING INTERNAL COMBUSTION ENGINES

The present invention relates to a filter construction and, more particularly to a soot filter adapted to be disposed in an exhaust gas stream of air-compressing internal combustion engines.

The aim underlying the present invention essentially resides in arranging and constructing a soot filter in such a manner that, an automatic burning-off of the soot filtered out of the exhaust gas stream occurs under physical operating conditions of the internal combustion engine relevant for a burning-off the soot.

The underlying problems are solved according to the present invention by providing a cylindrical filter housing arranged in proximity of the outlet or exhaust gas line of an internal combustion engine with inlet pipe connecting studs, which extends radially or tangentially from the internal combustion engine, being connected to the cylindrical filter housing. Ceramic fiber material in hollow cylindrical shape is arranged in the cylindrical filter housing and spaced at a distance from the circumferential wall of the filter housing. The ceramic fiber material consists of an outer layer of loose ceramic fiber wadding and of an inner woven ceramic fiber mat. A hollow space inside of the ceramic fiber material is connected with the exhaust gas line in the axial direction.

As a result of disposing the soot filter in the exhaust gas stream of the internal combustion engine, no external ignition source for burning off filtered out soot in the filter is required for cleaning the filter since the soot particles present in the exhaust gas ignite are still glowing and, consequently, burn-off the soot distributed over the ceramic fiber material of the filter.

As a result of the achieved uniform distribution of the soot over the ceramic fiber material of the soot filter only a slight local; heat transformation occurs so that an overheating of the soot filter can be avoided. Additionally, by the special construction and arrangement of the ceramic fiber material, oxygen required for a combustion or burning-off of the soot particles has access to the soot deposits in sufficient quantity and burned-off hydrocarbon particles can be conducted away and thus be removed from the soot filter.

In an advantageous construction of the subject matter of the present invention apertured sheet metal members may be disposed in the filter housing for radially inwardly and outwardly supporting the ceramic fiber material in the housing.

In order to support the ceramic fiber material, a wire, mesh having a small mesh size, may be arranged between the woven ceramic fiber mat and the inner apertured sheet metal member. Additionally, a further wire mesh, having large mesh size, may be provided between the small mesh size wire mesh and the inner apertured sheet metal member in order to improve flow conditions of the exhaust gases through the filter.

Accordingly, it is an object of the present invention to provide a soot filter for exhaust gases of air-compressing internal combustion engines which avoids by simple means shortcomings and drawbacks encountered in the prior art.

Another object of the present invention resides in providing a soot filter for exhaust gases of air-compressing internal combustion engines which is simple in construction, yet is highly effective for burning-off the filtered-out soot without requiring an external ignition source.

A further object of the present invention resides in providing a soot filter adapted to be located in an exhaust gas stream of air-compressing internal combustion engines which operates efficiently without requiring a supply of external energy.

A still further object of the present invention resides in providing a soot filter of the type described above which is so constructed and arranged as to avoid local overheating of the filter.

Another object of the present invention resides in providing a soot filter for exhaust gases of air-compressing internal combustion engines, which assures a sufficient supply of oxygen for burning-off filtered-out soot particles and which facilitates a removal of burned-off hydrocarbon particles.

These and other objects, features and advantages of the present invention will become more apparent from the following description when taken in connection with the accompanying drawing which shows, for purposes of illustration only, one embodiment in accordance with the present invention, and wherein.

Figure 1:
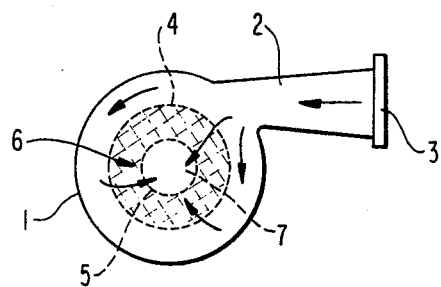
FIG. 1 is an end elevational view of a soot filter in accordance with the present invention.
Figure 2:
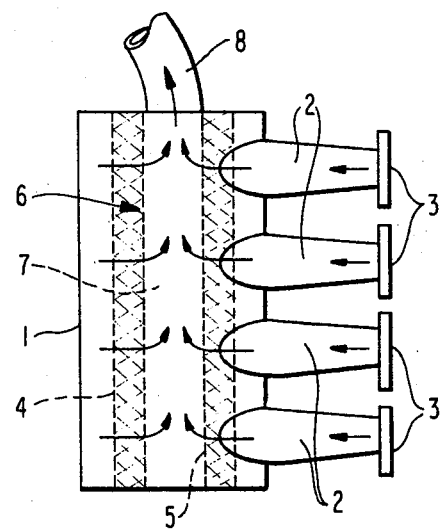
FIG. 2 is a plan view on the soot filter of FIG. 1.

Referring now to the drawing, wherein like reference numerals are used throughout the various views to designate like parts, according to FIGS. 1 and 2, a soot filter consists of a cylindrical filter housing 1 having connected thereto tangentially terminating filter inlet pipe connecting studs 2 which, in turn, are adapted to be secured by means of flanges 3 directly at the outlet or exhaust side of an internal combustion engine (not shown).

Ceramic fiber material generally designated by reference numeral 6, of a hollow cylindrical form, is arranged inside of the filter housing 1 between an outer apertured sheet metal member 4 and an inner apertured sheet metal member 5 in such a manner that exhaust gases entering through the inlet pipe connections 2 are circumferentially distributed in the filter housing 1 radially outside of the apertured sheet metal member 4 and then pass radially through the ceramic fiber material 6 and, exit from a cylindrical space 7, defined inside of the apertured sheet metal member 5, through a line 8 which connects the filter housing 1 to an exhaust pipe system (not shown) of the internal combustion engine.

Figure 3:
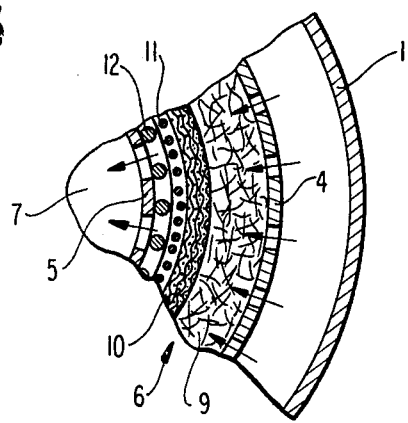
FIG. 3 is a partial cross-sectional view, on an enlarged scale, through the soot filter of FIGS. 1 and 2.

As can be seen more clearly from FIG. 3, the ceramic fiber material 6 between the apertured sheet metal members 4 and 5 consists of a radially outer layer of loose ceramic fiber wadding 9 and a radially inner layer of woven ceramic fiber matting 10 supporting the ceramic fiber wadding 9.

The ceramic fiber mat 10 is supported by a wire mesh 11 having a small mesh size with a wire mesh 12 having a mesh size larger than that of the wire mesh 11, being arranged between the wire mesh 11 and the inner apertured sheet metal member 5.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A soot filter adapted to be installed into an exhaust gas line of air-compressing internal combustion engines, the soot filter comprising a cylindrical filter housing means adapted to be arranged in proximity to an exhaust outlet of the internal combustion engine and having a clean gas outlet means filter inlet pipe connection means provided on the housing means adapted to be connected with the exhaust outlet of the internal combustion engine, ceramic fiber material arranged in the filter housing means at a distance from a circumferential wall thereof, said ceramic fiber material being of a hollow approximately cylindrical form and consisting of an outer layer of loose ceramic fiber wadding and an inner woven ceramic fiber mat, the ceramic fiber material being positioned within said housing means such that an exhaust gas stream flows through said inlet pipe connection means through said ceramic filter material and flows out through said clean gas outlet means, first and second apertured sheet metal means are provided for supporting the ceramic fiber material in the cylindrical filter housing means, said first and second apertured sheet metal means being disposed radially inwardly and radially outwardly of the ceramic fiber material, and a first wire mesh having a relatively small mesh size arranged between the inner woven ceramic fiber mat and the radially inwardly disposed apertured sheet metal means.

2. A filter according to claim 1, wherein the filter inlet pipe connection means extend radially from the cylindrical filter housing means.

3. A filter according to claim 1, wherein the filter inlet pipe connection means extend tangentially from the cylindrical filter housing means.

4. A filter according to claim 1, wherein a further wire mesh having a larger mesh size than the first wire mesh is arranged between the first wire mesh and the inner apertured sheet metal means.

5. A filter according to claim 4, wherein the filter inlet pipe connection means extend radially from the cylindrical filter housing means.

6. A filter according to claim 4, wherein the filter inlet pipe connection means extend tangentially from the cylindrical filter housing means.

* * * * *